United States Patent Office 3,546,070
Patented Dec. 8, 1970

3,546,070
FERMENTATIVE METHOD OF PRODUCING L-SERINE FROM DL-SERINE
Fumihiro Yoshinaga, Kawasaki-shi, Michiko Kimura, Tokyo, Masao Shibuya, Kawasaki-shi, and Shinji Okumura, Tokyo, Japan, assignors to Ajinomoto Co., Inc., Tokyo, Japan
No Drawing. Continuation-in-part of application Ser. No. 591,087, Nov. 1, 1966. This application May 1, 1969, Ser. No. 821,061
Claims priority, application Japan, Nov. 2, 1965, 40/67,182
Int. Cl. C12d 13/06
U.S. Cl. 195—2      12 Claims

ABSTRACT OF THE DISCLOSURE

L-serine substantially free from D-serine is obtained by selective decomposition of the D-serine in an aqueous solution of DL-serine by atmospheric oxygen in the presence of an enzyme available from known and newly discovered microorganisms.

---

This application is a continuation-in-part of our copending application Ser. No. 591,087, filed on Nov. 1, 1966, and now abandoned.

This invention relates to the optical resolution of racemic serine, and particularly to a method of preparing L-serine from DL-serine by microbial fermentation.

L-serine is classified as an amino acid non-essential to rats, but it has found applications as a food supplement and in medicine. L-serine has been isolated heretofore from protein hydrolyzates, and it has also been prepared by optical resolution of synthetic serine. The serine-bearing protein hydrolyzates contain other amino acids from which serine cannot be separated at high yield. L-serine, moreover, racemizes readily and also decomposes at the normal conditions for hydrolysis, whereby the yield of the hydrolysis method is further reduced.

Synthetic DL-serine has been optically resolved heretofore by means of acylase in a rather complex sequence of steps.

An object of the invention is the provision of L-serine at low cost in a simpler operation than was available until now.

We have found that DL-serine is attacked by certain enzymes of microbial origin in aqueous solution under aerobic conditions in such a manner that D-serine is selectively decomposed by the atmospheric oxygen in the presence of a catalytically effective amount of the enzyme while L-serine remains almost unchanged in the solution and can be recovered from the solution by conventional methods. The enzymes which have specific effects on D-serine have been found in liquid culture media in which certain microorganisms are grown in aqueous suspensions of the microorganisms, in extracts prepared from ground cells of the microorganisms, in the culture medium after removal of the microbial cells by filtration, and in a filtered, cell-free cell extract. Microorganisms which produce the enzymes include *Alcaligenes marshalii* No. 49 (ATCC No. 21030) and *Pseudomonas fragii* IAM 1650.

When a solution of DL-serine is exposed to air and a suitable enzyme source, the D-serine is decomposed fairly quickly, and the resulting solution contains L-serine as the only amino acid. It can, therefore, be recovered from the aqueous system without difficulty in a pure form.

The newly discovered strain of *Alcaligenes marshalii* No. 49 has been found in sewage by us, and has the following characteristic properties:

Shape and motility: Rods, 0.5 by 0.8 to 1.0 micron. Occurring singly, or in pairs. Non-motile. Gram-negative. Spore not formed.
Nutrient agar colonies: Circular, smooth, entire, raised, glistening, light brownish gray, opalescent, butyrous.
Glutamate agar colonies: Circular, smooth, entire, raised, glistening, pale yellowish brown, opalescent, butyrous.
Nutrient agar slant: Growth moderate, filiform, flat, glistening, light brownish gray, opalescent, butyrous.
Glutamate agar slant: Growth moderate, filiform, glistening, pale yellowish brown, opalescent, butyrous.
Nutrient broth: Turbid.
Nutrient gelatin stab: No liquefaction.
Milk: Unchanged.
B.C.P. milk: Unchanged.
Nitrite is not produced from nitrate in nitrate broth.
Nitrate respiration: Negative.
M.R. test: Negative.
V-P test: Negative.
Indole: Not produced.
Hydrogen sulfide produced.
Starch not hydrolyzed.
Gas and acid from carbohydrates: Aerobically or anaerobically, from glycerol, xylose, arabinose, glucose, fructose, sucrose, maltose, lactose, starch, adonitol, dulcitol mannitol, and inositol according to High and Liefson's method.
Reducing substance is not produced from gluconate.
Citrate, succinate, p-hydroxy-benzoate and protocartechuate utilized as a sole carbon source with ammonical nitrogen, but glucose and gluconate are not utilized.
Optimum temperature for growth: 20° to 30° C. Weak growth at 37° C., growth at 42° C.
Optimum pH for growth: Between pH 5.0 and pH 9.0. No growth at pH 4.0.
Urease: Negative.
Decarboxylase (Moller's method modified by Falkow).
Lysine: Negative.
Arginine: Negative.
Ornithine: Negative.
Malonate test (Shaw and Clarke's method): Negative.
Phenylalanine test (Shaw and Clarke's method): Negative.
Cytochrome oxidase: Negative.
Catalase: Positive.
Aerobic.
Source: Sewage.

The properties listed above are closely similar to those reported for *Alcaligenes marshalii* in "Bergey's Manual of Determinative Bacteriology," 7th edition, except for the inability of the new strain of liquefying gelatin.

The aforedescribed strain of *Alcaligenes marshalii* which is available from the American Type Culture Commission, and the known strain of *Pseudomonas fragii*, which is available from a stock culture at the Institute of Applied Microbiology at Tokyo University, Japan, may be cultured on conventional media containing sources of assimilable carbon and nitrogen, and the usual minor nutrients. They have been grown successfully on media containing carbohydrates (glucose, fructose, maltose, xylose, galactose, starch hydrolyzate, or molasses) or organic acids (acetic acid, fumaric acid, maltic acid, lactic acid, α-ketoglutaric acid, gluconic acid, pyruvic acid, or citric acid) as principal carbon sources, and may contain alcohols as supplemental carbon sources. The concentration of the carbon source in the medium is normally between 0.1 and 5% by weight, based on glucose equivalents.

D-serine is the best nitrogen source because the microorganisms suitable for use in this method are characterized by their ability of growing in a medium containing no other nitrogen source. However, nitrogen may also be provided in the form of ammonium salts of inorganic and organic acids (chloride, phosphate, nitrate, acetate, lactate, and others), of urea, or of ammonia in aqueous solution or in the gaseous state. Other amino acids with the exception of L-serine are also assimilated, and many other organic nitrogen sources are utilized when present. The concentration of equivalent nitrogen in the culture medium is preferably between 0.1 and 1.5 percent.

The medium should also contain the essential inorganic ions derived from potassium phosphate, magnesium sulfate, manganese sulfate, zinc sulfate, ferrous sulfate, sodium chloride, and calcium carbonate. Vitamins, fatty acids, and corn steep liquor, when present in the medium, have the expected growth promoting effect.

DL-serine is most effectively attached by the enzymes produced by the afore-mentioned microorganisms in aqueous solutions in which the serine concentration is between 0.5 and 10 percent, but higher serine concentrations are also operative. The DL-serine may be dissolved in the culture medium in which the microorganisms are to be cultured, or its solution in water may be mixed with enzyme sources derived from the culture broth in any conventional manner. The bacterial cells separated from the culture medium may be suspended in the serine solution, or the serine solution may be mixed with cell-free material derived from the microbes and dissolved in water.

The pH of the aqueous DL-serine solution containing the enzyme has an important bearing on the rate at which D-serine is being decomposed, on the overall time required for removing the D-serine, and on the ultimate yield of L-serine. Good results are obtained only at a pH of 5.5 to 8.5 which is normally approached from the acid side and maintained by additions of calcium carbonate, ammonia, caustic alkali, or phosphate buffer. It is preferred to establish aerobic conditions by actively mixing the culture medium with air, but the reaction also proceeds in a static medium open to the atmosphere. The microorganisms should be cultured for one to three days at 24° to 34° C., and the enzyme reaction also requires one to three days in the same temperature range.

The recovery of L-serine from the reaction mixture is readily accomplished by methods conventional for recovering amino acids from their aqueous solutions.

The following examples further illustrate this invention, but it will be appreciated that the invention is not limited thereby, but is defined solely by the scope of the appended claims.

EXAMPLE 1

An aqueous cluture medium was prepared to contain 0.1% glucose, 0.2% ammonium chloride, 0.05% sodium citrate, 0.2% potassium dihydrogen phosphate, 0.7% dipotassium hydrogen phosphate, 0.04% magnesium sulfate crystals, 2 p.p.m. Fe$^{++}$, 2 p.p.m. Mn$^{++}$, 0.1% polypeptone, 0.1% yeast extract, and 4% DL-serine. Its pH was adjusted to 6.5 with aqueous ammonia. 20 ml. batches of the solution were placed in 500 ml. shaking flasks, and were sterilized by steam at 110° C. for 5 minutes.

Alcaligenes marshalii No. 49 was cultured on bouillon agar slants, the aqueous media were inoculated with the cultures, and the microorganisms were cultured in the aqueous media at 30° C. for 48 hours with shaking. After 48 hours of fermentation, the medium contained 1.51 g./dl. L-serine.

The microbial cells were removed from the combined culture broths by filtration, and one liter of the cell-free solution was passed over a cationic ion exchange resin of the H type. 10.6 g. crude crystalline L-serine were thus obtained, and 5.8 g. pure crystalline L-serine were recovered from the crude material by recrystallization from water. The specific rotatory power of the pure matrial was $[\alpha]2_D^{20} = +14.5°$ (C=9, 1 N HCl) which is identical with the known rotation of L-serine. No D-serine was found in the material by means of D-amino acid oxydase.

EXAMPLE 2

The procedure described in Example 1 was repeated wtih the exception that one-half of the DL-serine was added to the culture only 24 hours after inoculation, and the other half 48 hours after inoculation. The concentration of L-serine in the fermentation mixture was thereby increased to 3.11 g./dl. after 72 hours of fermentation.

EXAMPLE 3

When *Pseudomonas fragii* IAM 1650 was substituted for *Alcaligenes marshalii* in the procedure of Example 1, the concentration of L-serine in the fermentation mixture reached 1.03 g./dl. after 48 hours of cultivation.

Substantially the same results were obtained when the microbial cells were separated from the culture medium by filtration or centrifuging and suspended in an aqueous solution of 40 g./l. DL-serine which was held at pH 5.5–8.5 by periodical additions of ammonia, or when the DL-serine solution was mixed with an aqueous cell-free solution of cell contents obtained from either of the two strains by grinding the cells with water and removing the insoluble cell material by filtration. Air was passed through the serine solutions containing the enzyme sources, and the L-serine formed was recovered by the method described in Example 1.

Closely similar results as those described in Examples 1 to 3 have been obtained under analogous conditions with the following microorganisms:

*Pseudomonas chlororaphis* ATCC 9447
*Alcaligenes beniptrificans* ATCC 15173

All microorganisms referred to in this specification were deposited with the depository agencies identified by their initials or otherwise and made available to the public prior to the filing of this application.

What is claimed is:
1. A method of producing L-serine which comprises
   (a) dissolving DL-serine in an aqueous liquid;
   (b) holding said DL-serine in said liquid in contact with oxygen in the presence of a source of an effective amount of an enzyme until the D-serine in said DL-serine is substantially decomposed;
      (1) said enzyme being capable of catalyzing the oxidation of said D-serine substantially without decomposing the L-serine in said DL-serine; and
   (c) recovering said L-serine from said medium.

2. A method as set forth in claim 1, wherein said enzyme source is prepared by aerobically culturing a microorganism on an aqueous culture medium containing sources of assimilable carbon and nitrogen, and minor nutrients, the microorganism being capable of growing on a culture medium containing D-serine as the sole nitrogen source while being unable of growing on a culture medium containing L-serine as the sole nitrogen source, the microorganism being cultured on said aqueous culture medium until said enzyme is formed.

3. A method as set forth in claim 2, wherein said culture medium constitutes said aqueous liquid, and is being held at pH 5.5 to 8.5 during said culturing.

4. A method as set forth in claim 3, wherein said DL-serine is dissolved in said culture medium and the medium is thereafter inoculated with said microorganism.

5. A method as set forth in claim 3, wherein said dissolved DL-serine constitutes said source of nitrogen.

6. A method as set forth in claim 2, said microorganism being a strain of *Alcaligenes marshalii, Alcaligenes beniptrificans, Pseudomonas chlororaphis* or *Pseudomonas fragii.*

7. A method as set forth in claim 3, wherein said microorganism is *Alcaligenes marshalii* No. 49 (ATTCC 21030) or *Alcaligenes beniptrificans* (ATCC 15173).

8. A method as set forth in claim 3, wherein said microorganism is *Pseudomonas fragii* IAM 1650 or *Pseudomonas chlororaphis* (ATCC 9447).

9. A method as set forth in claim 2, wherein said microorganism is substantially separated from said aqueous culture medium after said culturing thereof, the medium substantially free from the microorganism constituting said source of said enzyme.

10. A method as set forth in claim 2, wherein said microorganism is substantially separated from said aqueous culture medium after said culturing thereof, the separated microorganism constituting said source of said enzyme.

11. A method as set forth in claim 2, wherein said microorganism is of the genus Alcaligenes or of the genus Pseudomonas.

12. An enzyme capable of catalyzing the oxidation of D-serine by gaseous oxygen substantially without decomposing L-serine when said enzyme is present in a solution of DL-serine in an aqueous liquid together with said gaseous oxygen.

References Cited
UNITED STATES PATENTS

| | | | |
|---|---|---|---|
| 3,290,225 | 12/1966 | Rauenbusch et al. | 195—29 |
| 3,322,646 | 5/1967 | Kawai et al. | 195—29 |

LIONEL M. SHAPIRO, Primary Examiner

U.S. Cl. X.R.

195—29